United States Patent [19]
Laucht et al.

[11] Patent Number: 4,876,448
[45] Date of Patent: Oct. 24, 1989

[54] OPTICAL SYSTEM FOR MOTION COMPENSATION OF LINE SCANNERS

[75] Inventors: Horst Laucht, Bruckmühl; Jürgen F. Euskirchen, Waidhofen, both of Fed. Rep. of Germany

[73] Assignee: Messerschmitt-Bólkow-Blohm GmbH, Munich, Fed. Rep. of Germany

[21] Appl. No.: 259,479

[22] Filed: Oct. 17, 1988

Related U.S. Application Data

[63] Continuation of Ser. No. 879,125, May 21, 1986, abandoned.

[30] Foreign Application Priority Data

Sep. 21, 1984 [DE] Fed. Rep. of Germany ....... 3434794

[51] Int. Cl.$^4$ .............................................. G02B 26/10
[52] U.S. Cl. ..................................... 250/234; 350/6.8
[58] Field of Search ................................. 250/234–236; 350/6.7–6.8, 486; 358/206

[56] References Cited

U.S. PATENT DOCUMENTS 4,202,597  5/1980  Moore ................................. 350/6.8

*Primary Examiner*—Edward P. Westin
*Attorney, Agent, or Firm*—Kenyon & Kenyon

[57] ABSTRACT

An optical system for motion compensation of line scanners to improve the resolution in one or more spectral channels, the system having a motion of its own or being arranged on a moving observation platform. A multi-faced prism is provided which is associated with the optical system and rotates about its central axis at a settable rotational speed. The integration time for imaging a radiation source is increased due to the rotation of the prism in a direction opposite the track or flight direction.

3 Claims, 3 Drawing Sheets

OPTICAL SYSTEM FOR MOTION COMPENSATION OF LINE SCANNERS

This is a continuation of application Ser. No. 879,125, filed May 21, 1986, now abandoned.

CROSS-REFERENCE TO RELATED APPLICATIONS

This application claims the benefit under 35 U.S.C. Sections 120 and 365(c) of International application No. PCT/DE85/00321 filed Sept. 14, 1985 claiming priority of German Application No. P34 334 794.1 filed Sept. 21, 1984.

BACKGROUND OF THE INVENTION

The present invention relates to an optical system for motion compensation of line scanners to improve the resolution in one or more spectral channels, the system having a motion of its own or being arranged on a moving observation platform.

Such systems are known in themselves. Point or single detectors have been used until now, where it is necessary to represent all image points successively on the detector by corresponding scanning systems. With the "starring" or "push broom" systems now available, an improvement has taken place in that all points of a picture, scene or scan line, respectively, can be detected simultaneously. The disadvantage of this improvement is, however, that when such a system is located on a moving platform, the resolution diminishes because during the recording or polling time the object "wanders off", resulting in an undesired movement blur.

SUMMARY OF THE INVENTION

It is an object of the present invention to provide an optical system for line scanners which permits compensating for the movement blur and increasing the sensitivity and/or the time resolution of the system.

The above and other objects of the present invention are achieved by an optical system for motion compensation of a line scanner to improve resolution in at least one spectral channel, the system having a motion of its own or being arranged on a moving observation platform, the system comprising optical means for directing light along an optical path from a radiation source to a detector and further comprising a multi-faced prism, the prism disposed in the optical path and rotating about a central axis thereof at a predetermined rotational speed in a direction opposed to the direction of the platform or the system motion for increasing the integration time for imaging the radiation source on the detector.

BRIEF DESCRIPTION OF THE DRAWINGS

In the description which follows, embodiments are explained and schematically represented in the drawing figures in which.

DETAILED DESCRIPTION

Figure 1:
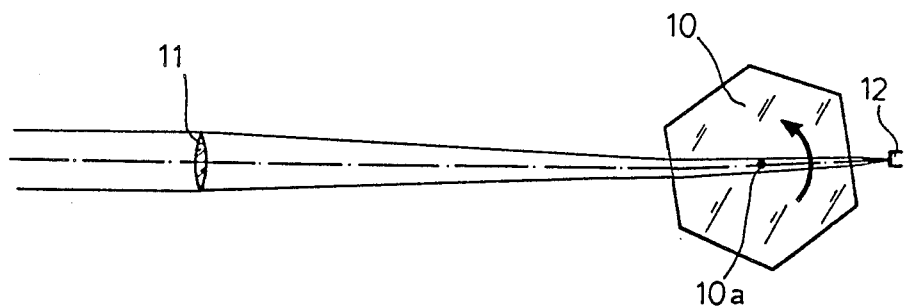
FIG. 1 shows a schematic representation of the principle of construction of a one-channel line scanner with motion compensation.

With reference now to the drawings, for motion compensation in line scanners in flight or placed in orbit in satellites, the integration time will be variably adjustable by adding suitable rotating multiple reflectors and/or prisms whose axis of symmetry lies parallel to the line axis. This is illustrated schematically in FIG. 1 in the example of a one-channel line scanner. Here a multi-faced prism 10 is associated with an optical system 11. The prism rotates about its central axis 10a, opposed to the flight direction, the rotational speed being matched to the geometric and radiometric requirement of the respective mission.

Figure 5:
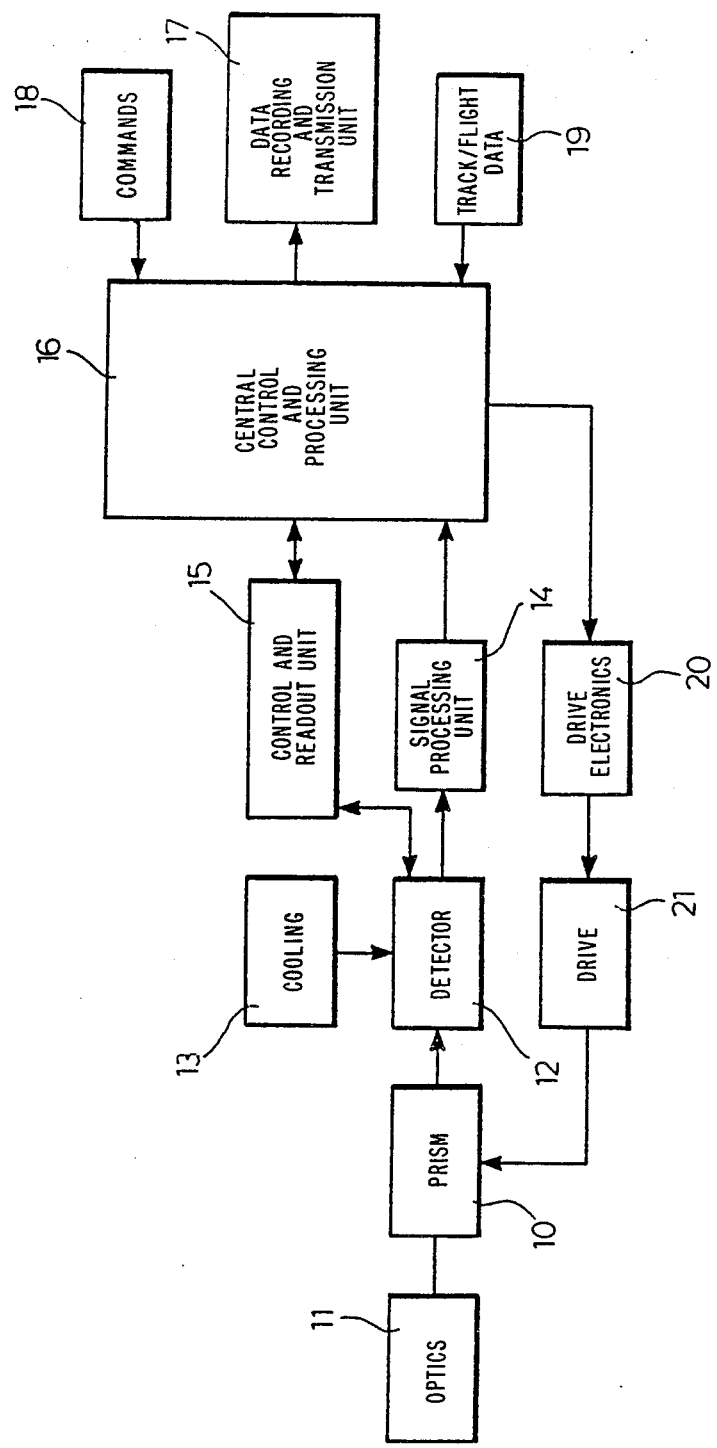
FIG. 5 is a block diagram for the embodiment of a one-channel line scanner version with motion compensation according to FIG. 1.

A block diagram for such a one-channel line scanner is shown in FIG. 5. By a central control and processor unit 16, which stores the signals of a command unit 18 as well as the track or flight data 19, the prism is set, via the drive electronics 20 and the drive 21, into the rotation required as a minimum by the respective integration time. The signals received via the optical system 11 are directed by the prism 10 onto the detector 12, which feeds them via signal processing unit 14 to the central control and processor unit 16, whence they are supplied to a data recording and transmission unit 17 as well as to a drive and readout unit 15, the latter electronic unit connecting the detector 12 to the central control and processor unit 16 directly. The cooling unit provided for the detector 12 is shown at 13.

Figure 1A:
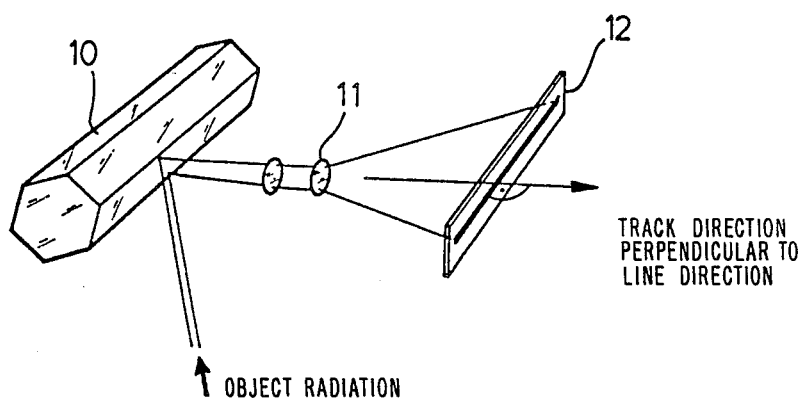
FIG. 1a shows a schematic representation of an embodiment with freely selectable speed of rotation and direction of the reflector, the track or flight direction being perpendicular to the line direction.

FIG. 1a shows a schematic representation of an embodiment with freely selectable speed of rotation and direction of the reflector, the track direction being perpendicular to the line direction.

It has been found to be an additional advantage of the invention that by the realized prolongation of the integration time for the same scene, the aperture of the optical system can be chosen smaller and also the readout frequency, i.e., the frequency at which the image information is read out from the detector elements, may be reduced.

Figure 2:
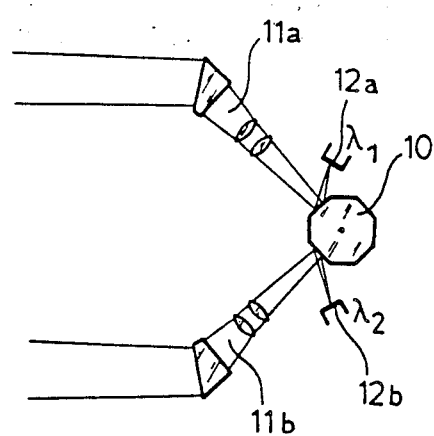
FIG. 2 is a schematic representation of an embodiment with a prism and two optical systems and detectors.
Figure 3:
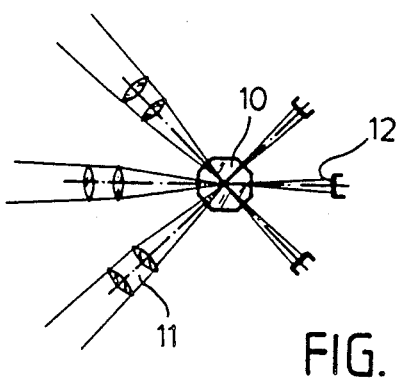
FIG. 3 is a schematic representation of a stereo version of the invention.
Figure 4:
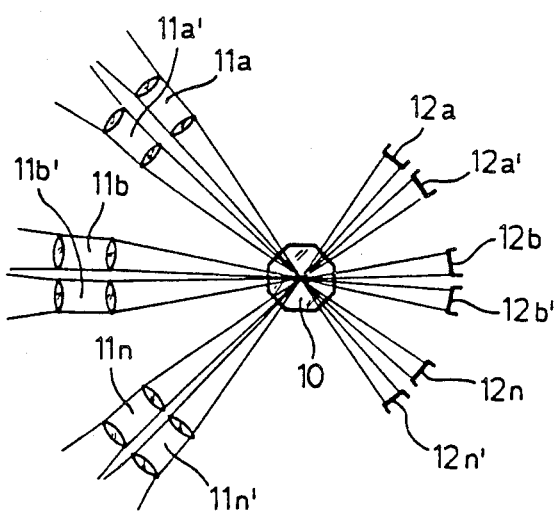
FIG. 4 is a schematic representation of a stereo two-channel version of the invention.

FIGS. 2 to 4 show various versions of the invention, in particular so-called stereo versions. The prism can be manufactured so that it can be used in transmitted radiation or in reflection. It can be used for several spectral channels simultaneously and thus ensures their correlatability. According to FIG. 2 two spectral channels $\lambda_1$ and $\lambda_2$ are imaged in reflection on detectors 1a and 1b, respectively. $\lambda_1$ and $\lambda_2$ are mean wavelengths determined by the flight mission, the bandwidth $\Delta\lambda$ being optimized for the mission. Preferably, in accordance with the requirements of the flight mission, line or area sensors are utilized as the detectors, for example, Schottky barrier detectors or other extrinsic detectors.

The receiver surfaces of the detectors 12a to 12n in FIG. 4 may be selected so that equal resolution or else a targeted or desired ratio is obtained. The time and space correlation is ensured by the respective arrangement selected. The integration time for imaging the scene can be prolonged by appropriately choosing the rotational speed of the rotating prism 10.

The prerequisites for comparative spectral analysis are thus established and in addition data reduction is possible in a greatly simplified form. This has been made possible by the use of spectrally identical or different parallel systems or respectively identical or different optical systems 11a–11n and detector sizes 12a–12n. Furthermore, the system decides for itself whether temporarily stored information is to be transferred to a long-term memory or if the temporary memory is to be utilized for this purpose.

By the use of coupled systems of the above-described kind, a continuous record is obtained at increased integration time. The described system makes possible, in addition, a substantial reduction of the spectral bandwidth.

In the foregoing specification, the invention has been described with reference to exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An optical system for motion compensation of a line scanner to improve resolution in at least one spectral channel, the system having a motion of its own or being arranged on a moving observation platform, the system comprising optical means for directing light along an optical path from a radiation source to at least one detector and further comprising a multi-faced prism, said prism disposed in the optical path and rotating about a central axis thereof at a predetermined rotational speed in a direction opposed to the direction of the platform or the system motion for increasing the integration time for imaging the radiation source on the detector.

2. The optical system recited in claim 1, wherein the optical means comprises means for supplying images from a radiation source to more than one face of the multi-faced prism and a plurality of detectors, each detector associated with a respective face of the prism.

3. An optical system to improve the resolution in a line scanner with at least one spectral channel, the line scanner and the optical system having a common platform, said platform being in motion, the optical system comprising a receiving system optic means for receiving light from a radiation source; at least one line detector sensor means receiving light from the optic means and having a central longitudinal axis, said axis being arranged perpendicular to the direction of the platform's motion; and a multi-faced prism with a central axis arranged parallel to the central longitudinal axis of the sensor means, said prism located in an optical path of the light from the radiation source received by said line detector sensor means, and further comprising rotational means for rotating the prism in a direction opposed to the direction of the platform at a rate determined by the velocity of the platform for increasing the integration time for imaging the radiation source on the line detector sensor means.

* * * * *

UNITED STATES PATENT AND TRADEMARK OFFICE
CERTIFICATE OF CORRECTION

PATENT NO. : 4,876,448

DATED : October 24, 1989

INVENTOR(S) : Horst Laucht et al

It is certified that error appears in the above-identified patent and that said Letters Patent is hereby corrected as shown below:

Column 1, line 13 should read

--of German Application No. P 34 34 794.1 filed Sept. 21,--.

Column 2, line 55, change "detectors 1a and 1b" to read

--detectors 12a and 12b--.

Signed and Sealed this

Third Day of March, 1992

Attest:

HARRY F. MANBECK, JR.

Attesting Officer

Commissioner of Patents and Trademarks